United States Patent [19]

Yoshizawa et al.

[11] Patent Number: 5,448,289
[45] Date of Patent: Sep. 5, 1995

[54] LINEAR ILLUMINATOR FOR READING SEPARATED COLOR IMAGE USING LINEAR SENSOR

[75] Inventors: Satoru Yoshizawa, Chofu; Eisaku Maeda, Sakura, both of Japan

[73] Assignee: Nikon Corporation, Tokyo, Japan

[21] Appl. No.: 283,194

[22] Filed: Aug. 4, 1994

Related U.S. Application Data

[63] Continuation of Ser. No. 744,455, Aug. 12, 1991, abandoned.

[30] Foreign Application Priority Data

Aug. 29, 1990 [JP] Japan ................... 2-227081

[51] Int. Cl.[6] .......................................... H04N 9/04
[52] U.S. Cl. ........................... 348/98; 358/490
[58] Field of Search .............. 348/268, 270, 101, 104, 348/98; 358/490, 491, 487, 473; H04N 9/04

[56] References Cited

U.S. PATENT DOCUMENTS

| | | | |
|---|---|---|---|
| 2,458,649 | 1/1949 | Schade | 358/42 |
| 2,880,267 | 3/1959 | Goldmark et al. | 358/42 |
| 3,875,587 | 4/1975 | Pugsley | 358/490 |
| 4,725,891 | 2/1988 | Marian | 358/490 |
| 4,855,818 | 8/1989 | Morimoto et al. | 358/42 |
| 4,887,153 | 12/1989 | Uehara et al. | 358/42 |
| 5,103,385 | 4/1992 | Federico et al. | 358/491 |
| 5,339,107 | 8/1994 | Henry et al. | 348/270 |

FOREIGN PATENT DOCUMENTS

| | | |
|---|---|---|
| 62-140529 | 9/1987 | Japan . |
| 63-108332 | 5/1988 | Japan . |
| 0505912 | 5/1939 | United Kingdom ................. 358/42 |

Primary Examiner—James J. Groody
Assistant Examiner—Jeffrey S. Murrell
Attorney, Agent, or Firm—Shapiro and Shapiro

[57] ABSTRACT

A linear illuminator for image reading by the use of a linear sensor comprises a linear illumination light source, a cylindrical rotational member provided about the circumference of the linear illumination light source, and plurality of color separation filters installed on the rotational member. By controlling the rotation of the rotational member, plural kinds of color separation linear illumination light are output in the time series. The cylinder may have a shielding area between filters, which enables measurement of the dark current of the linear sensor.

17 Claims, 3 Drawing Sheets

LINEAR ILLUMINATOR FOR READING SEPARATED COLOR IMAGE USING LINEAR SENSOR

This is a continuation of application Ser. No. 07/744,455 filed Aug. 12, 1991, now abandoned.

BACKGROUND OF THE INVENTION

1. Field of the Invention

The present invention relates to an illuminator having a linear illuminating area for reading a separated color image using a sensor having a linear reading area.

More particularly, the present invention relates to an illuminator for color separated transmission of illumination light used for an image reading apparatus (referred to as film scanner) in which, for example, an original image of a color positive film is converted into separated color analog signals (such as three prime color image signals RGB) by operating a CCD line sensor to scan, and these signals are processed by an A/D converter for storage as digital data.

2. Related Background Art

Now, in conjunction with FIG. 1 and FIG. 2, a conventional illuminator for reading color separated image using a linear sensor will be described with a film scanner taken as an example.

FIG. 1 is a cross-sectional view showing the layout of a conventional film scanner and FIG. 2 is a perspective view showing the principal part of the structure of the conventional film scanner.

In FIG. 1 and FIG. 2, reference numeral 1a designates a halogen lamp with a mirror, and the cross-section of its irradiating beam is substantially a circle with a luminous distribution of the so-called Gaussian distribution wherein the intensity is greater in the vicinity of the optical axis of the beam and becomes less towards the circumference thereof.

A reference numeral 21 designates an infrared cutting filter, which is provided between a light source 1a and the surface of a filmed original 24 to protect a CCD line sensor 12 from being affected by any infrared light. The original is supported by a supporting frame 9.

A reference numeral 22 designates an uneven illumination correcting filter provided between the light source 12 and the surface of the original 24 in order to make the Gaussian distributed circular irradiation beam an even circular illumination. The uneven illumination correcting filter 22 is such that its density changes gradually by the distance from the center of the optical axis, that is, the density being higher toward the center (the transmissivity is low) and lower toward circumference (the transmissivity is high). Hence the luminous intensity in the circular illumination area is made substantially even.

A reference numeral 23 designates a condenser lens, and 2g designates a filter supporting disc which is a plate substantially in the shape of circle with color separation filters 3, 4, and 5 installed thereon and rotatively structured with an axis 2h as its center. The rotation of the aforesaid filter supporting disc 2g is controlled by a stepping motor 7.

In the case where the original of a color negative film is converted into monochrome, a monochrome conversion correcting filter 6 is provided in order to obtain desirable monochrome image signals by correcting the spectral characteristics of the light source, filmed original, and CCD line sensor. The film supporting frame 9 is movable in the sub-scanning direction by a known transporting mechanism (not shown).

A reference numeral 10 designates a mirror and 11, an image formation lens.

The illuminating light from the halogen lamp 1a illuminates the filmed original 24 supported by the film supporting frame 9 through the infrared cutting filter 21, color separation filter 3, for example uneven illumination correcting filter 22, and the condenser lens 23.

The optical path is bent by the mirror 10, and the image of the filmed original is formed on the CCD line sensor 12 by the image formation lens 11, and is converted by a photoelectric converter so as to output linear image signals.

When the image signals of the filmed original 24 have been read using the color separation filter 3, by the relative traveling of the CCD line sensor 12 and the filmed original 24, the filter supporting disc 2g is controlled by motor 7 to be rotated to enable the next reading using the color separation filter 4. Then, subsequent thereto, the reading is performed using the color separation filter 5 to complete the readings of the filmed color original.

If the filmed original in color is converted into monochrome image signals, the filter 6 would be selected for the reading operation.

It is possible to employ a photointerrupter for the detection of the reference position of the filter supporting frame, and if a stepping motor is used, the filter can be selected arbitrarily because the step numbers for each of the filters to enter the optical path from the reference position detected by the aforesaid photointerrupter are predetermined.

With a conventional structure such as this, the apparatus is disadvantageously large. Particularly, the distance between the light source and the filmed original is long, making it difficult to miniaturize the apparatus.

Also, the illumination for the linear reading area illuminates an area which is not linear, i.e., the circular area with the aforesaid linearity as its center. Therefore, not only the lighting efficiency is low, but it is also difficult to correct the unevenness of the illumination, and there remains the uneven illumination in the area to be scanned by the line sensor.

SUMMARY OF THE INVENTION

An object of the present invention is to eliminate the above-mentioned drawbacks and provide a small linear illuminator for image reading.

According to the present invention, the illuminator is of such a structure that a cylindrical rotational member supporting a plurality of color separation filters surrounds the periphery of a linear light source such that plural kinds of linear illumination light for color separation may be output in time series by controlling the rotation of the rotational member. With such an arrangement, miniaturization of the apparatus is possible. Also, there is provided an illuminating area which substantially the same as the reading area for the line sensor to read. Therefore, there is no possibility of illuminating any unnecessary areas, thus making the illuminating efficiency high.

DESCRIPTION OF THE PREFERRED EMBODIMENTS

Figure 3:
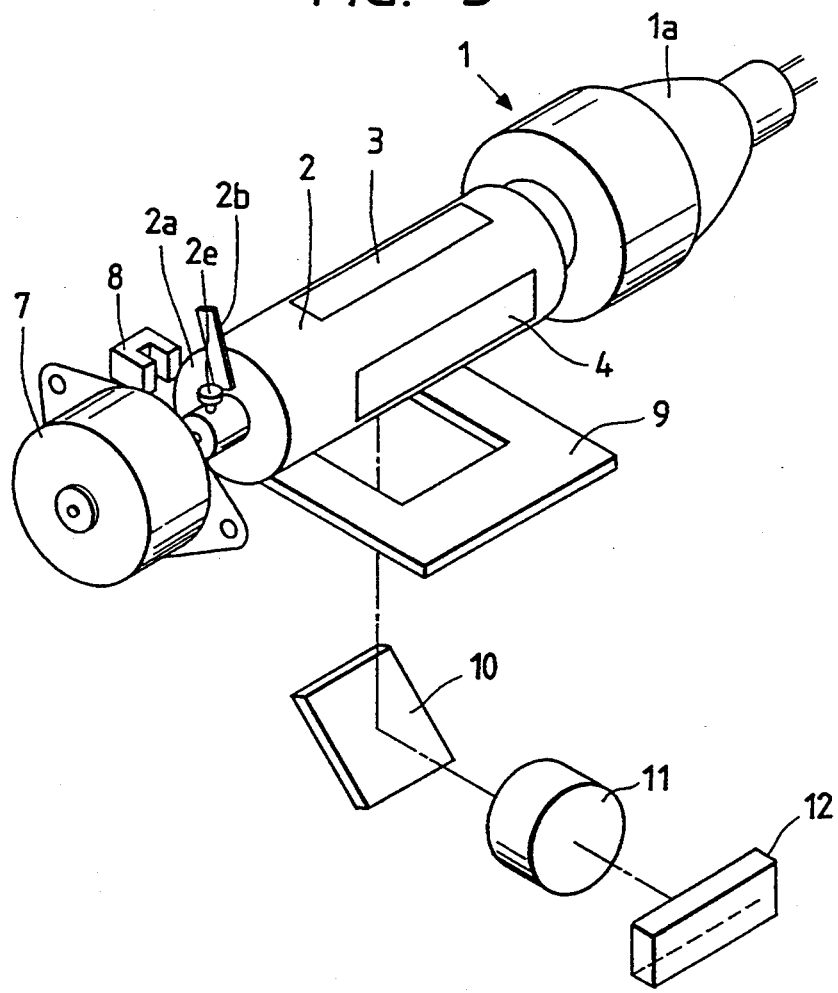
FIG. 3 is a perspective view showing an apparatus for reading a color separated image using an illuminator according to the present invention.
Figure 4:
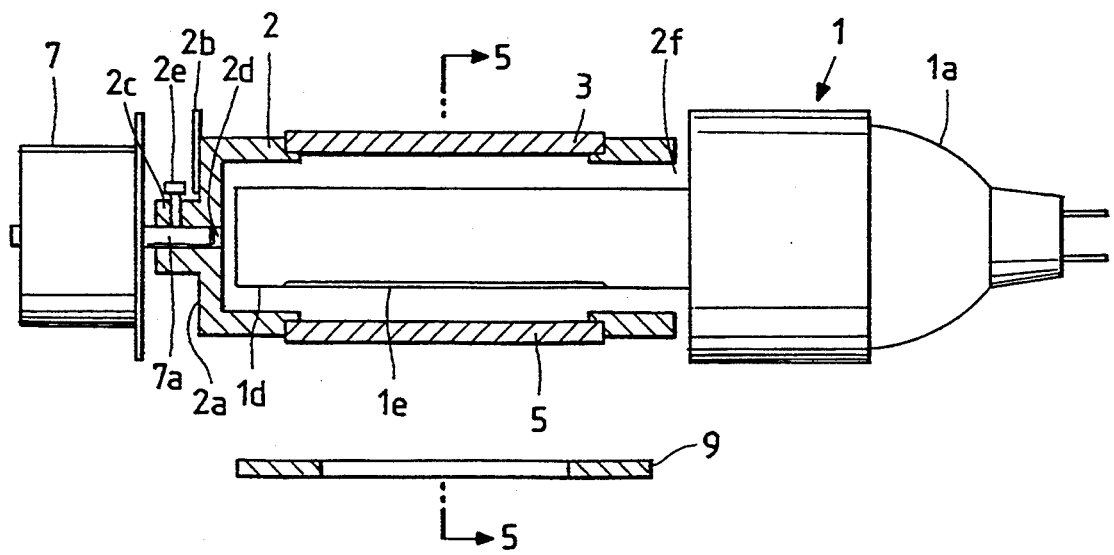
FIG. 4 is a partial cross-sectional view showing the illuminator of FIG. 3.
Figure 5:
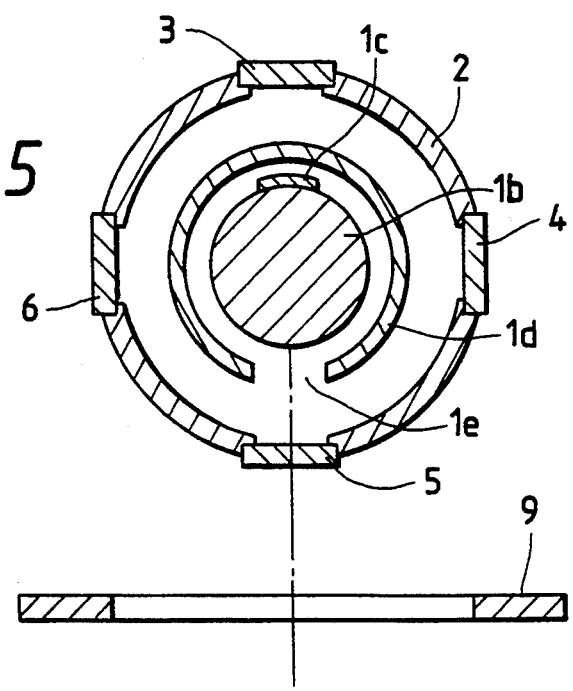
FIG. 5 is a cross-sectional view taken along the line 5—5 in FIG. 4.

In FIG. 3 through FIG. 5, there is shown an exemplary embodiment of the invention using the linear illumination light source known from Japanese Utility Model Laid-Open Application No. 62-140529 and Japanese Patent Laid-Open Application No. 63-108332, which obtains a linear illuminating area by providing a diffused band for a quartz rod. In place thereof, however, it may be possible to use a linear illumination light source which obtains the linear illuminating area by covering a luminescent lamp with a cover having slits.

Figure 1:
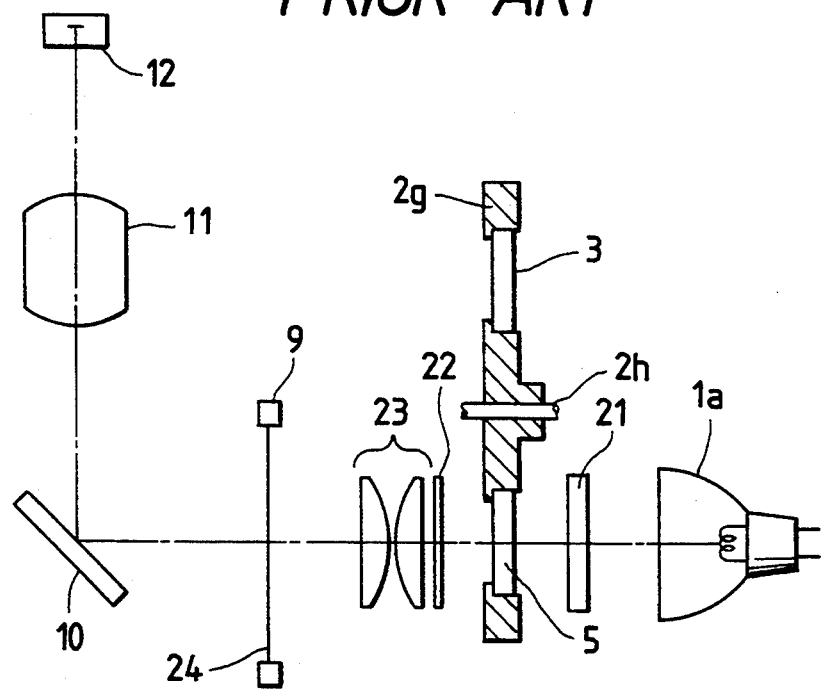
FIG. 1 is a cross-sectional view showing the layout of a conventional film scanner.
Figure 2:
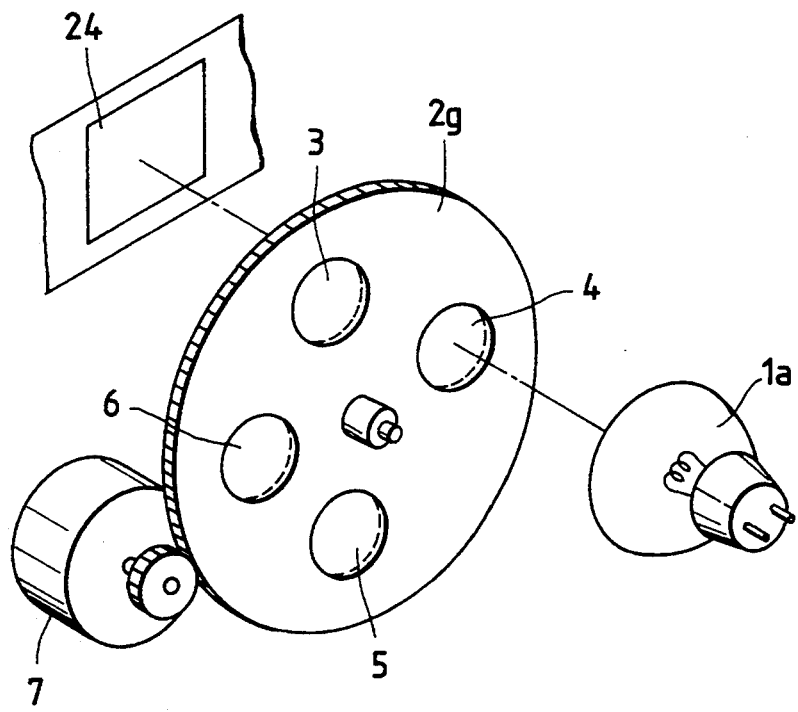
FIG. 2 is a perspective view showing the structure of the principal part of conventional film scanner.

In the illustrative embodiment, elements corresponding to those shown in FIG. 1 and FIG. 2 are described using the same reference designations.

In FIG. 3 through FIG. 5, a linear illumination light source 1 is provided with a halogen lamp 1a, a reflection mirror and infrared cutting filter. This light source has a luminous intensity distribution of the so-called Gaussian distribution as described earlier in conjunction with FIG. 1 and FIG. 2. A reference numeral 1b designates a quartz rod; 1c, a diffusion band; and 1d, a cylindrical cover with a slit opening 1e provided on the lower face thereof. Light from the halogen lamp 1a is introduced into the inside of the quartz rod 1b from one end and reflected. Then, the diffused rays of light diffused by the diffused band 1c are output from the slit opening 1e; thus the linear illumination light is obtained. The linearly illuminating light illuminates the filmed original 24 supported by the film supporting frame 9 after having passed through the color separation filters 3, 4, and 5, or the monochrome conversion correcting filter 6, the arrangement of which filters will be explained shortly. The light having passed through the filmed original 24 is caused by the mirror 10 to bend its optical path to form an image on the CCD line sensor 12 by the image-formation lens 11. As shown in FIG. 4, around the outer periphery of the cylindrical cover 1d, a substantially coaxial cylinder 2 with a circular shielding bottom 2a is provided to mount the color separation filters and the monochrome conversion correcting filter. On the center of the circular bottom 2a, a projection 2c is provided in the axial direction, and a hole 2d is cut in the center of the aforesaid-projection 2c. The rotational shaft 7a of a stepping motor 7 is inserted into the aforesaid hole 2d and is fixed by a set member 2e. From the opening end 2f of the filter installation cylinder 2, the cover 1d of the aforesaid linear illumination light source 1 is fittedly inserted coaxially. On the aforesaid bottom portion 2a, a small flat piece 2b is projectedly provided to interrupt the optical path of a light emitting and receiving portion 8 so that the so-called photointerrupter is constituted.

The reading of the color filmed original with the above-mentioned structure is performed by, firstly, driving the stepping motor 7 for the predetermined step numbers from the reference position of the filter installation cylinder 2 detected by the photointerrupter, so that the filter 3 is brought to a stop in the linear illumination area of the linear illumination light source 1, i.e., the location facing the slit opening 1e. In this state, the film supporting frame 9 supporting the filmed original 24 is displaced in the sub-scanning direction to allow the filmed original 24 to be read. Subsequently, the stepping motor 7 is driven for the predetermined step numbers to bring the filter 4 to a stop in the linear illuminating area of the linear illumination light source 1 to allow the filmed original 24 to be read by the CCD line sensor 12 while sub-scanning the film supporting frame 9. Further, the stepping motor 7 is driven for a predetermined step numbers to bring the filter 5 to a stop in the linear illuminating area of the linear illumination light source 1 to allow the filmed original 24 to be read by the CCD line sensor 12 while sub-scanning the film supporting frame 9; thus completing the reading of the filmed original 24 with the three prime colors.

In the case where the color filmed original 24 is to be read after monochrome conversion, the stepping motor 7 is driven for the predetermined step numbers from the reference position detected by the photointerrupter so that the filter 6 is allowed to face the slit opening 1e to be read by the CCD line sensor 12 while the film supporting frame 9 is being subscanned.

Figure 6:
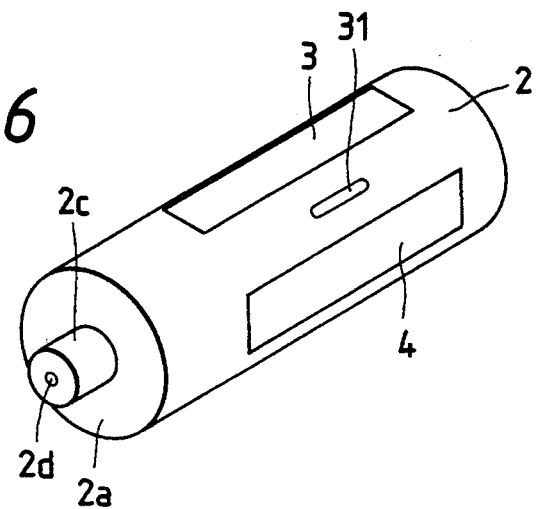
FIG. 6 and FIG. 7 are perspective views showing other embodiments which enable detection of the reference positions of the filter supporting cylinder.
Figure 7:
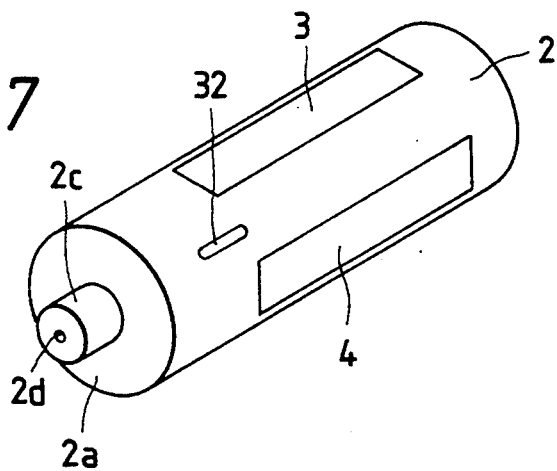

FIG. 6 and FIG. 7 are views showing other embodiments for detecting the reference positions of the filter installation cylinder 2.

In FIG. 6 and FIG. 7, slit openings 31 and 32 are provided in the locations on the filter installation cylinder 2 where the filters 3, 4, 5, and 6 are not arranged, and light from the linear illumination light source is transmitted through the slit openings 31, and 32. In FIG. 4, the slit opening 31 is arranged between the filter 3 and filter 4, i.e., within the image reading area of the CCD line sensor. Therefore, although there is an advantage that the image reading CCD line sensor can be used in combination as it is, if the density of the portion of the filmed original 24 facing the slit opening 31 is thick, the transmitting light is blocked; thus making it impossible for the CCD line sensor 12 to detect such portion.

In FIG. 7, the slit opening 32 is arranged outside the image reading area of the CCD line sensor. Therefore, even if the density of the filmed original 24 is extremely thick, its detection is possible. However, it is necessary to provide a slightly longer CCD line sensor dedicated for the detection of the slit opening 32.

It will be appreciated that, it is possible to perform the detection of the reference positions by means other than the photointerrupter. For example, it is possible to structure the system so that the absolute position of the stepping motor can be detected by a rotary encoder.

Also, since the filter installation cylinder 2 has light shielding property, it is possible to measure the dark current of the CCD line sensor if the sensor can be controlled to stop at the position where no filter is in the linear illuminating area of the light source.

Also, it is possible to obtain an extremely miniaturized system as an illuminator for image reading by arranging a cylindrical rotational member about the outer periphery of a linear illumination light source and a plurality of color separation filters on the aforesaid rotational member to output plural kinds of color separation linear illumination light by controlling the rotation of the aforesaid rotational member.

We claim:

1. A linear illuminator for image reading by the use of a linear sensor, comprising:
   a linear illumination light source having a linear light-emission area;
   a cylindrical rotational member disposed about the circumference of said light source;
   a plurality of transmissive color separation filters installed on said rotational member at circumferentially displaced positions, such that plural kinds of color separated linear illumination light can be transmissively outputted via the respective filters in time series by controlled rotation of said rotational member; and
   light shielding means provided at a position circumferentially between a pair of said filters which are adjacent to one another for selectively blocking the light output of said light source when said rotational member is at a predetermined rotational position.

2. A linear illuminator according to claim 1, wherein said rotational member has slit means disposed at a predetermined position for transmitting light from said light source to indicate a reference position.

3. A linear illuminator according to claim 2, wherein said slit means is disposed between a second pair of said filters which are adjacent to one another.

4. A linear illuminator according to claim 2, wherein said slit means is disposed at a position offset from said filters axially of said rotational member.

5. A linear illuminator according to claim 1, further comprising photointerrupter means including a light-interrupting piece projecting from said rotational member and a light emitter and a light receiver disposed such that said light-interrupting piece interrupts an optical path therebetween at a predetermined rotational position of said rotational member.

6. A linear illuminator according to claim 1, including a monochrome conversion correction filter installed on said rotational member at a position circumferentially displaced from each of said color separation filters.

7. A linear illuminator for image reading by the use of a linear sensor, comprising:
   a linear illumination light source;
   a linear apertured partition disposed in the vicinity of said linear illumination light source and substantially surrounding said linear illumination light source;
   a cylindrical rotation member disposed about said linear apertured partition and including a plurality of circumferentially displaced light filters; and
   a motor for rotating said cylindrical rotation member such that linear illumination light can be output via said light filters in time series.

8. A linear illuminator according to claim 8, wherein an opening is formed at a surface portion of said rotational member between an adjacent pair of said filters for transmitting light from said light source to indicate a reference position of said rotational member.

9. A linear illuminator according to claim 7, wherein said linear illumination light source comprises a quartz rod and an elongate diffusion member disposed in proximity thereto.

10. A linear illuminator according to claim 9, wherein an opening is formed at a surface portion of said rotational member between an adjacent pair of said filters for transmitting light from said light source to indicate a reference position of said rotational member.

11. A linear illuminator according to claim 7, wherein said plurality of filters include color separation filters and a monochrome conversion correcting filter.

12. A linear illuminator according to claim 11, wherein an opening is formed at a surface portion of said rotational member between an adjacent pair of said filters for transmitting light from said light source to indicate a reference position of said rotational member.

13. A linear illuminator according to claim 7, further comprising a light shielding portion disposed between an adjacent pair of said filters.

14. A linear illuminator according to claim 13, wherein an opening is formed at a surface portion of said rotational member between another adjacent pair of said filters for transmitting light from said light source to indicate a reference position of said rotational member.

15. A linear illuminator according to claim 7, wherein said linear illumination light source includes an elongate diffuser which is illuminated at one end.

16. A linear illuminator according to claim 15, wherein an opening is formed at a surface portion of said rotational member between an adjacent pair of said filters for transmitting light from said light source to indicate a reference position of said rotational member.

17. A linear illuminator for use in an image reading apparatus, comprising an elongate light source, a filter structure mounted for rotation about said light source and having a plurality of linear color separation filters arranged at respective angular positions around said filter structure, and a linear apertured partition disposed between said light source and said filter structure so as to permit light from said light source to pass through only one of said filters at any time, such that a linear band of light of selected color can be produced by rotatably orienting said filter structure about said light source.

* * * * *